US010073552B2

(12) United States Patent
Layton

(10) Patent No.: US 10,073,552 B2
(45) Date of Patent: Sep. 11, 2018

(54) MULTI-DIMENSIONAL MULTI-FINGER SEARCH USING OVERSAMPLING HILL CLIMBING AND DESCENT WITH RANGE

(71) Applicant: CIRQUE CORPORATION, Salt Lake City, UT (US)

(72) Inventor: Michael D. Layton, Salt Lake City, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 93 days.

(21) Appl. No.: 14/156,087

(22) Filed: Jan. 15, 2014

(65) Prior Publication Data

US 2014/0198076 A1 Jul. 17, 2014

Related U.S. Application Data

(60) Provisional application No. 61/752,550, filed on Jan. 15, 2013.

(51) Int. Cl.
*G06F 3/044* (2006.01)
*G06F 3/041* (2006.01)

(52) U.S. Cl.
CPC .. *G06F 3/0416* (2013.01); *G06F 2203/04104* (2013.01)

(58) Field of Classification Search
CPC ..................................................... G06F 3/044
See application file for complete search history.

(56) References Cited

U.S. PATENT DOCUMENTS

| 5,207,491 | A | 5/1993 | Rottinghaus |
| 5,825,352 | A | 10/1998 | Bisset et al. |
| 6,639,584 | B1 | 10/2003 | Li |
| 7,812,828 | B2 | 10/2010 | Westerman et al. |
| 8,797,277 | B1 * | 8/2014 | Grygorenko ............... 345/173 |
| 8,816,986 | B1 | 8/2014 | Park et al. |
| 2003/0234771 | A1 | 12/2003 | Mulligan |
| 2004/0001048 | A1 | 1/2004 | Kraus |
| 2004/0188151 | A1 | 9/2004 | Gerpheide et al. |
| 2005/0017959 | A1 | 1/2005 | Kraus et al. |
| 2005/0052427 | A1 | 3/2005 | Wu et al. |
| 2006/0031786 | A1 | 2/2006 | Hillis et al. |
| 2006/0187214 | A1 | 8/2006 | Gillespie et al. |
| 2006/0279551 | A1 | 12/2006 | Lii et al. |
| 2006/0288313 | A1 | 12/2006 | Hillis et al. |
| 2007/0074913 | A1 | 4/2007 | Geaghan |
| 2007/0103452 | A1 | 5/2007 | Wakai et al. |
| 2007/0139395 | A1 | 6/2007 | Westerman et al. |
| 2007/0165005 | A1 | 7/2007 | Lili et al. |
| 2007/0252821 | A1 | 11/2007 | Hollemans et al. |
| 2007/0285404 | A1 | 12/2007 | Rimon et al. |
| 2008/0036473 | A1 | 2/2008 | Jansson et al. |
| 2008/0036743 | A1 | 2/2008 | Westerman et al. |

(Continued)

FOREIGN PATENT DOCUMENTS

| JP | 2001134382 A | 5/2001 |
| JP | 2001290585 A | 10/2001 |

(Continued)

*Primary Examiner* — Charles Hicks
(74) *Attorney, Agent, or Firm* — Parsons Behle & Latimer

(57) ABSTRACT

A method for detecting and tracking multiple fingers in a two dimensional set of results using oversampling hill climbing and descent with range.

18 Claims, 7 Drawing Sheets

(56) References Cited

U.S. PATENT DOCUMENTS

| | | |
|---|---|---|
| 2008/0122799 A1 | 5/2008 | Pryor |
| 2008/0158175 A1 | 7/2008 | Hotelling |
| 2008/0158176 A1 | 7/2008 | Land et al. |
| 2008/0158185 A1 | 7/2008 | Westerman |
| 2008/0165141 A1 | 7/2008 | Christie |
| 2009/0141046 A1 | 6/2009 | Rathnam et al. |
| 2010/0053091 A1* | 3/2010 | Lee et al. ............ 345/173 |
| 2010/0193258 A1 | 8/2010 | Simmons et al. |
| 2012/0200512 A1 | 8/2012 | Olivier |

FOREIGN PATENT DOCUMENTS

| | | |
|---|---|---|
| JP | 2001356878 A | 12/2001 |
| WO | 2005114369 A2 | 12/2005 |

\* cited by examiner

MULTI-DIMENSIONAL MULTI-FINGER SEARCH USING OVERSAMPLING HILL CLIMBING AND DESCENT WITH RANGE

BACKGROUND OF THE INVENTION

Field of the Invention

This invention relates generally to touch sensors. More specifically, the present invention is a method for using data from a touch sensor to detect and track multiple objects using a two dimensional set of results from the touch sensor.

Description of Related Art

There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

The prior art includes a description of a touchpad that is already capable of the detection and tracking of multiple objects on a touchpad. This prior art patent teaches and claims that the touchpad detects and tracks individual objects anywhere on the touchpad. The patent describes a system whereby objects appear as a "maxima" on a curve. Consequently, there is also a "minima" which is a low segment of the curve where there is no detection of an. FIG. 2 is a graph illustrating the concept of a first maxima 30, a minima and a second maxima 34 that is the result of the detection of two objects on a touchpad.

It would be an advantage over the prior art to provide a new detection and tracking method that can be used to detect and track movement of multiple fingers from a two dimensional data set, and does not rely on identifying maxima and minima.

BRIEF SUMMARY OF THE INVENTION

In a first embodiment, the present invention is a method for detecting and tracking multiple fingers in a two dimensional set of results using oversampling hill climbing and descent with range.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
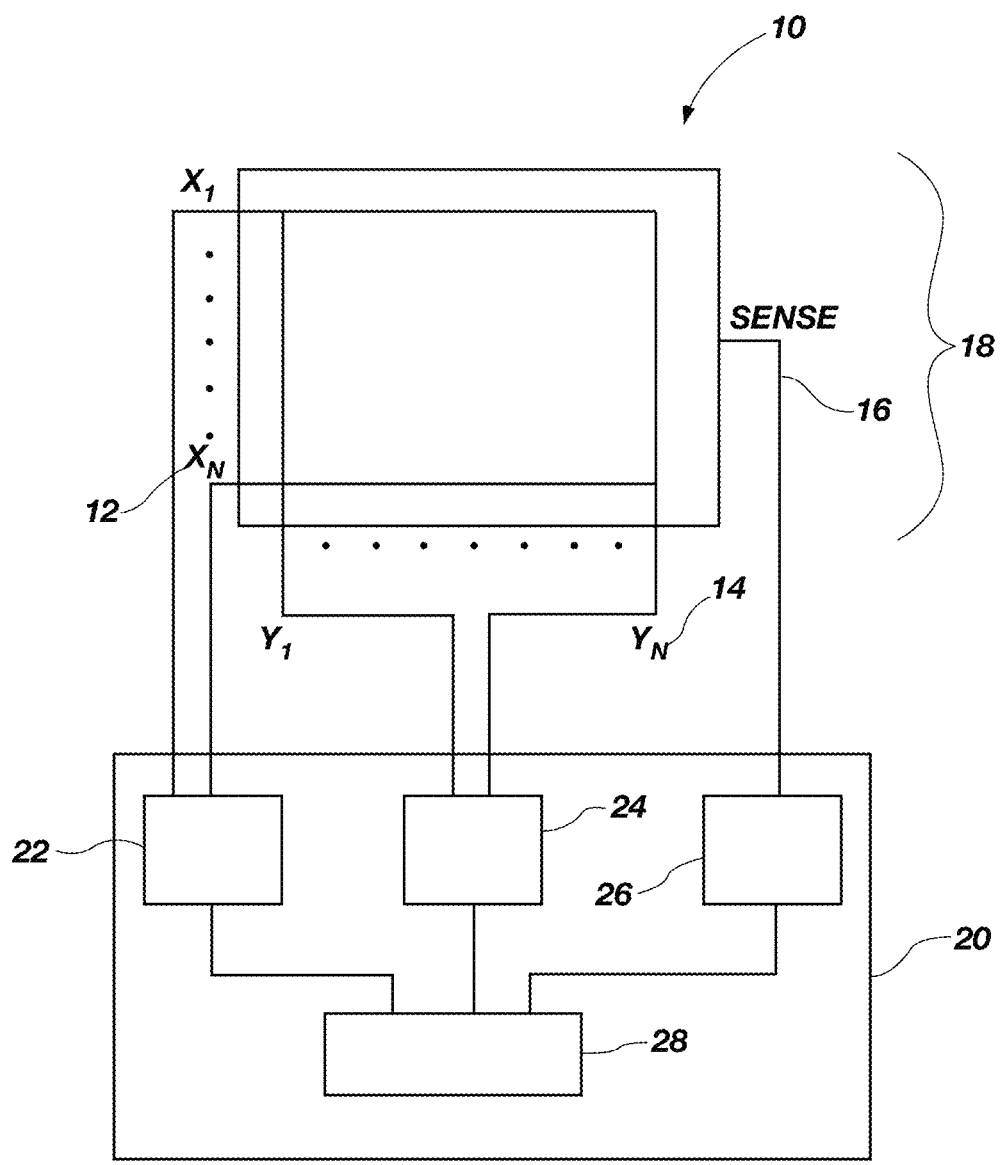
FIG. 1 is a block diagram of operation of a first embodiment of a touchpad that is found in the prior art, and which is adaptable for use in the present invention.
Figure 2:
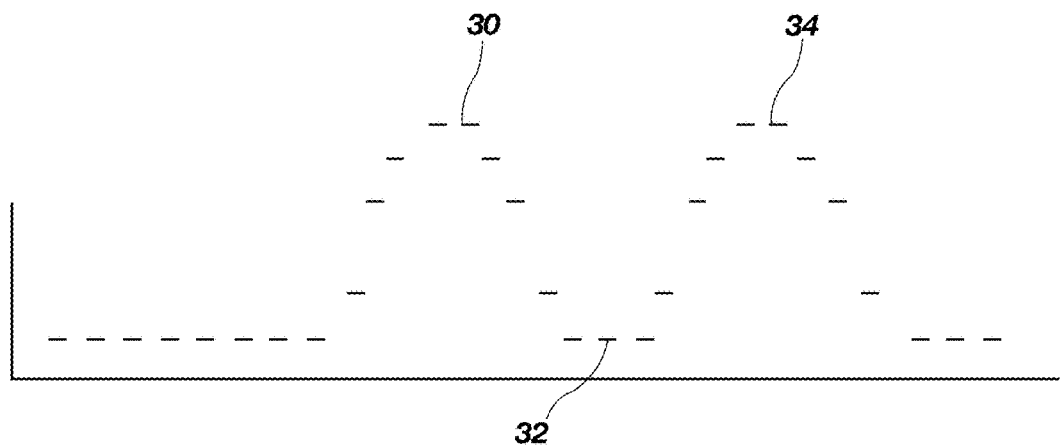
FIG. 2 is a graph from the prior art that shows having to identify a maxima for each object detected and an intervening minima.

The prior art shown in FIG. 2 teaches that to find multiple fingers, a sensor result can be scanned in one dimension looking for a maximum followed by a minimum, followed by another maximum, to identify a first finger, a space between the fingers and then a second finger, corresponding to said first and second maxima. However, it has been determined that treating the data from a touch sensor as one dimensional is inadequate and may fail to correctly identify multiple fingers in some circumstances.

First, the prior art may fail to identify multiple fingers for certain positions of the fingers on a touch sensor. The maxima and minima may only exist in certain trajectories and may not exist in others, so fingers with maxima and/or minima that occur only in trajectories other than those being used will not be found. In other words, there is no predefined scan trajectory (i.e. cross section of measurements at discrete locations) nor set of trajectories (such as scanning horizontally, vertically or diagonally) that will correctly identify all fingers on a touch sensor.

Second, while summing of cross axis results may be used in an attempt to "take in" maxima and minima that would otherwise be missed, this may cause fingers to be hidden. Therefore, two fingers whose results are being summed into the same results may effectively be invisible. With two fingers present and summed orthogonally, it is impossible to tell which results correspond across the orthogonal axes, so the two fingers may be at either of two locations. This is a situation known as ghosting, where a finger may appear to be in two locations at the same time because of the nature of some orthogonal touch sensors. The result is that third and fourth fingers which are actually at the ghost locations may be completely undetectable using the prior art methods of detection.

Third, there is a fundamental "aliasing" problem when two dimensional data are captured discretely, and which goes beyond the normal sampling requirements. For example, it is known that sample frequency must be sufficiently high to capture the variation that exists in a measurement. For one dimensional measurements, once the sample rate is high enough, a one dimensional scan may correctly observe all the maxima and minima. However, when variations of measurements exist across two dimensions, and the data are captured discretely, aliased maxima and minima are intrinsic. Local maxima and minima may be defined as variations in strength of a signal from a single object as the single object is spread over several locations.

Figure 3:
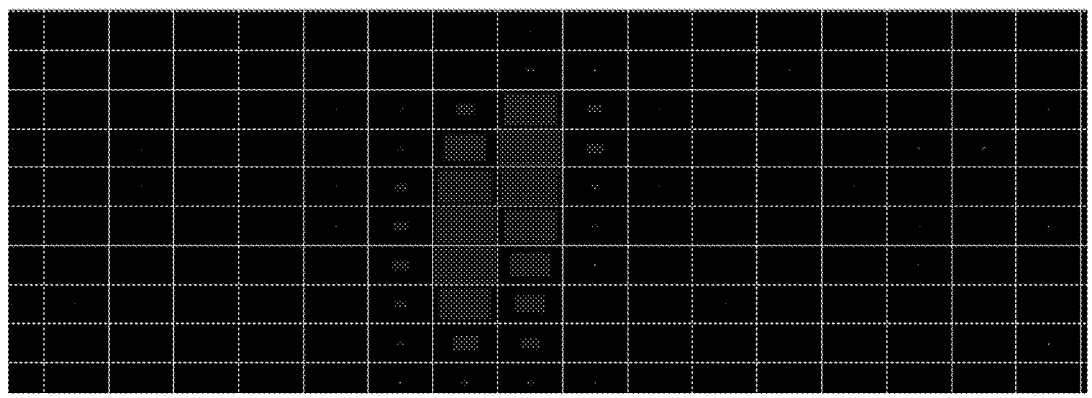
FIG. 3 is a representation of data from a touch sensor where one finger is present, but the prior art will show as one or two fingers.

FIG. 3 is provided as a representation of the prior art view of a single finger. However, the prior art sees the finger arbitrarily as one or two fingers, depending upon how the measurements are sectioned. A horizontal sectioning of data likely will see one maximum and thus one finger, as well as vertical sectioning. However, diagonal sectional most likely would incorrectly identify two maxima and thus two fingers. The results may be shown as a surface of varying size of dots or varying height, where the size or the height represents the magnitude of capacitance change by the finger's presence.

Figure 4:
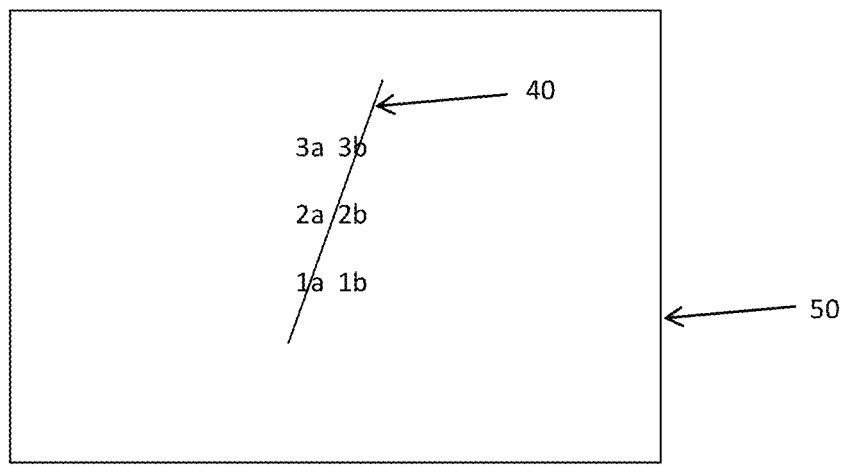
FIG. 4 is a representation of a touch sensor and only six locations, out of many locations, wherein the six locations shown the location of an object as represented by a ridge line.

For example, consider an array of samples from six locations as shown in FIG. 4. The measurements at these locations may be seen as a surface of the side of a thumb, or a finger (as shown in FIG. 3) that is making contact with more than a fingertip, and which is roughly linear and moving from lower left (1a) to upper right (3b) of the touch sensor 50. The shape of the thumb or finger (hereinafter referred to as a finger) may be represented by ridge line 40, and may also be seen as having a distinct lowland-peak-lowland in signal strength when moving from upper left 3a to lower right 1b.

The actual maximum of the finger may be outside this set of measurements at these locations. What is important is that the ridge line 40 runs through the identified locations such that 1a and 3b are directly under the ridge line 40. Locations 2a and 2b are on either side of the ridge line 40. Thus 1a and 3b are associated with distinct maxima of a first finger location. Note that decreasing the sample granularity (i.e. increasing the two dimensional sample rate) does not get rid of this problem. For any fixed sampling trajectories (scanning vertically, horizontally, diagonally or some other trajectory), there exists a thumb position such that a ridge line runs alternately through and between locations, thereby creating aliased maxima and minima on the touch sensor 50.

With all of these problems identified, the first embodiment of the present invention may solve these problems by not using one dimensional data but instead by only using two dimensional data. In other words, the present invention does not use simple one dimensional data to find the location of multiple objects on a touch sensor.

The first step of this first embodiment is to scan the entire two dimensional array of locations as defined by an orthogonal touch sensor grid that creates the touch sensor 50. The purpose of the complete scan may be to identify all locations having a measurement result or signal strength (hereinafter referred to as a result) which is greater than zero such that it may indicate the presence of a first finger. A location that is identified as possibly having a finger may be identified as a first finger location because there may be more than one finger present.

It may be desirable to oversample to qualify this location. For example the location can be checked to make sure that there are results around this location which indicate that at least one finger, which would cover multiple locations, is actually present. This location is used as a starting point for step 2. The location may be identified as a current first finger location.

The second step is to perform a hill climbing procedure from the current first finger location. The hill climbing procedure may be referred to as moving inward to a highest location of the at least one finger. In other words, the algorithm tries to determine if there is a location that is adjacent to the current first finger location which has a value that is greater than the value of the current first finger location.

For the reasons stated previously, an algorithm which only looks for a first finger location having the highest value, even by comparing a result with all two dimensional surrounding results, is not adequate. The hill climbing algorithm must skip over local minima caused by aliasing. For example, from FIG. 4, there may be local maxima at locations 1a and 3b. To determine which is the highest local maxima, there is a local minima (dip in signal strength) between them. The ability to bypass the local minima may be accomplished, for example, by comparing a weighted sum of near cross axis results.

Figure 5:
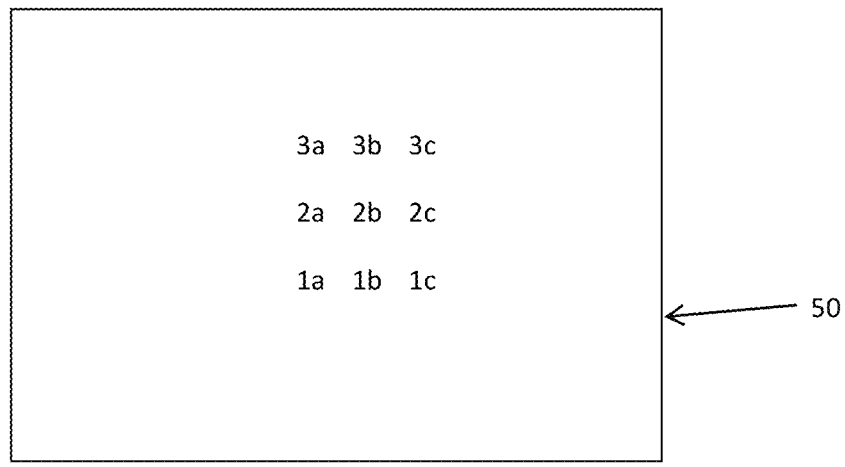
FIG. 5 is a representation of a touch sensor and a different set of locations that may detect an object.

As an example of comparing a weighted sum of near cross axis results, assume the hill climbing algorithm has climbed to location 2b as the current first finger location as shown in FIG. 5. Suppose the hill climbing algorithm is now going to consider the value at location 3b.

A weighted sum of near cross axis results may be performed as follows. A weighted pattern is applied by multiplying and summing adjacent cross axis values. In this example, the hill climbing algorithm uses a 1-2-1 pattern. The equation then is (1*3a+2*3b+1*3c). Thus, if (1*3a+2*3b+1*3c>1*2a+2*2b+1*2c) then 3b may be considered to be inward, or has a higher signal strength or higher result, and the hill climbing algorithm may climb to location 3b.

Before moving to location 3b, the hill climbing algorithm may also consider (at least) the immediately adjacent values of the locations 2a, 1b, and 2c as well, by using the same weighted average comparisons. Therefore, if (1*1a+2*2a+1*3a>1*1b+2*2b+1*3b) then 2a may also have a higher value and be inward. This particular weighted pattern 1-2-1 may be chosen as appropriate for a particular implementation based on samples versus typical finger shape. For other relationships, other weighting patterns may be appropriate, e.g. 1 2 4 2 1 or even a two dimensional weighted pattern e.g.:

$$\begin{array}{ccccc} 0 & 1 & 1 & 1 & 0 \\ 1 & 2 & 4 & 2 & 1 \\ \hline 1 & 2 & 4 & 2 & 1 \\ 0 & 1 & 1 & 1 & 0 \end{array}$$

Choosing to compare 2b to the values of 2a, 3b, 2c and 1b may be known as a 4-connected comparison because the center value 2b is compared to the 4 closest locations. However, a hill climbing algorithm that includes diagonal values may be considered to be an 8-connected comparison that includes a two dimensional sampling. Accordingly, an N-connected comparison makes a comparison of N locations in a desired arrangement near to the current first finger location.

Note that filtering (e.g. low pass averaging) a two dimensional result array to reduce aliasing could help with this aliasing problem, but may only be as effective if separate filtered data arrays are created for each potential climbing direction. This is because the filtering that takes place in the potential direction of climb blurs the data in the computation. A key benefit of this algorithm is that it only averages in the cross axis direction, thus clarifying the climb comparison.

In digital signal processing terms, this analysis may be a simple wavelet transformation. Additional wavelet analysis may lead to further alternatives. Note that hill climbing algorithm need not, and often does not, identify a maximum for a finger.

Figure 6:
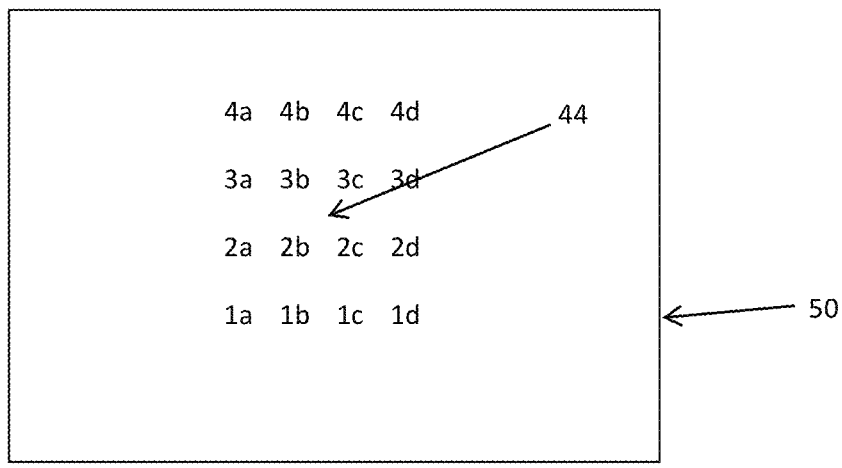
FIG. 6 is a representation of a touch sensor and a different set of locations that may detect an object.

The following example shows one scenario when the hill climbing procedure may fail to find the maximum. FIG. 6 shows a touch sensor 50 having at least 16 locations, 1a through 4d.

Consider that the actual location of a finger is roughly in the center of the above locations as indicated by arrow 44. Accordingly the signal strength or results from the locations 2b, 2c, 3b, and 3c forming the first location set are approximately equal. 1b, 1c, 2d, 3d, 2a, 3a, 4b, and 4c are approximately equal as well, although smaller than the first location set. When 1b>1c, 3a>2a, 4c>4b, and 2d>3d, sufficiently so that these inequalities dominate the comparisons, the algorithm may climb clockwise 2c→2b→3b→3c→2c and repeating infinitely. If this condition is reached, it is sufficient to end the hill climbing algorithm and assign the current first finger location to be on any of these locations.

Terminating the infinite loop of the hill climbing algorithm may be accomplished, for example, by either limiting the maximum steps allowed for climbing, or detecting that a location has been previously occupied in a current measurement cycle. For example, limiting the maximum steps to be N steps, where N may be determined through experimentation to find how many steps are needed to be sure that the infinite loop may be terminated because the maximum of the hill climbing algorithm has been determined, or the current measurement cycle may be limited when the infinite loops is just repeating locations. In either case, the current first finger location may not necessarily be a maximum.

It may also be observed that the hill climbing algorithm has traced a boundary around the actual finger location 44 at some threshold level, such that results within the boundary are above some level that is still not known. This is important in the next step of the algorithm.

Note that the hill climbing algorithm's climbing path is not determined in advance and may include zigzags, arbitrary turns, and even a spiral. One theoretical limit of path length may be the total number of samples, i.e. the entire 2d array (with a variety of possible paths which go through all of them). In practice, once a few inward steps have been completed the range of inward directions is significantly limited, so paths are typically much less than the diameter of a finger. Limiting the algorithm in this manner may result in termination with further inward opportunities, but this is typically not a problem since being near the center of the finger is generally adequate to begin step 3.

The third step of the first embodiment is to perform a hill descending algorithm, taking in results from locations as part of the finger. This step, like step 2 with maxima, may be susceptible to false minima that are aliased into the results. Accordingly, searching for actual minima may be unacceptable.

The purpose of the hill descending algorithm is to determine if there are any other fingers on the touch sensor 50. If the location of the maximum of the first finger location has been determined, then all iterations of the hill descending algorithm may indicate that there are no other maximums of other fingers on the touch sensor because all subsequent calculations will show that all the results are from the first finger, and not from another finger. This is indicated because the results of other locations will fall within the decreasing range until the range is effectively decreased to zero.

However, if another finger is present, the hill descending algorithm will eventually indicate that results are increasing for locations in the direction of another finger. These other locations eventually become a seed for repeating the algorithm of the first embodiment in order to perform the hill climbing algorithm up to the other finger or fingers.

One solution to this problem may be to allow a range of results which are then assumed to be part of the first finger. In other words, consider a maximum of a first finger. The maximum may be a measured result of 7000. This value is arbitrarily selected and is for illustration purposes only.

A range is now added to the value of the first finger. This range should be large enough to allow for the variation in results due to how they line up with local ridge lines, but small enough to avoid taking in results from the central area of a nearby finger that is not the first finger already located.

In other words, as a practical matter, it may be previously determined that if the results of adjacent locations are going to decrease, they will decrease at a particular rate. This is then factored into the range and even accounting for some noise in an adjacent location, the range is large enough to include the adjacent locations as being part of the first finger. Thus, if the value of the range is selected to be 2000 (again, this value is arbitrarily selected for this example only), then the sum of the first finger and the adjacent location is supposed to be less than 9000. If there is a jump in value over the expected value of 9000, then the adjacent location may be part of a nearby finger.

For a touch sensor with reasonably adequate samples and sensitivity, it is known that a range may be selected that will work. This range may be selected through trial and error as experience is gained with using multiple fingers on a particular touch sensor. What must be realized is that the range will be known for the purposes of the first embodiment.

Another factor may be that the hill descending algorithm may need to remember that it has descended, regardless of direction. Results from locations appropriate to include initially, when the range is high, are then included only if adjacent.

Later, after results from locations that are lower down the hill from the maxima of the first finger have been included, samples up the hill may need to be excluded, regardless of adjacency, as they have now been computed to be in some other finger.

Repeated and complex downward trajectories from the hill may be used to make sure the algorithm descends correctly while skipping over false minima. These downward trajectories may include keeping track of distance traveled versus amount descended. This simple method of excluding results that are above the expected range means that such an accumulation of information is not necessary.

As an example, the hill descending algorithm is initialized with the location found in step 2, and the range may be set to a value at that location plus a margin. For example, all 8-connected surrounding samples that are within the range may be included. Note that if the current first finger location happened to be the maximum, there would be no additions during this iteration, since all adjacent samples would be lower, but this is not necessarily the case since the first finger location may not be the maximum. Since the range is tuned to allow for local variations, this step typically does take in adjacent samples that are greater than the first finger location.

Once no more adjacent samples are in the current value of the range, the range is decreased or moved down and the process is repeated. The amount the range is incremented is mainly a practical consideration. Ideally it would be decremented just enough to take in a result from the adjacent locations, but this may be computationally expensive, so a stepped approach may be adequate. In other words, the range may be decremented by a fixed amount which is some fraction of the range. This process continues until the range is near enough to zero that further results are irrelevant.

Note that this hill descending algorithm step typically identifies a boundary with an adjacent finger by comparison of adjacent results using the range, and this is performed locally. It is only after the descent is complete that the results may be evaluated to see if any results remain in step 4. The remaining results may be other fingers that must now be located using the first embodiment.

Finally step 4 is to repeat what was done in step 1 while excluding results included in the first finger identified in step 3. This is an opportunity to exclude as potential fingers any locations that were not taken in during step 3 due to being above the allowable range, but are not surrounded by enough remaining results to qualify as a finger. Note that should such locations exist, they are likely to be local maxima, but the algorithm has provided sufficient information to disqualify them as potential distinct fingers. They may, in fact, include the actual maximum of the finger already found.

Conversely, if a potential finger remains, the qualified location is seeded as the current first finger (although it is a second or subsequent finger) and the algorithm is repeated by beginning with step 2 of the first embodiment.

Figure 7:
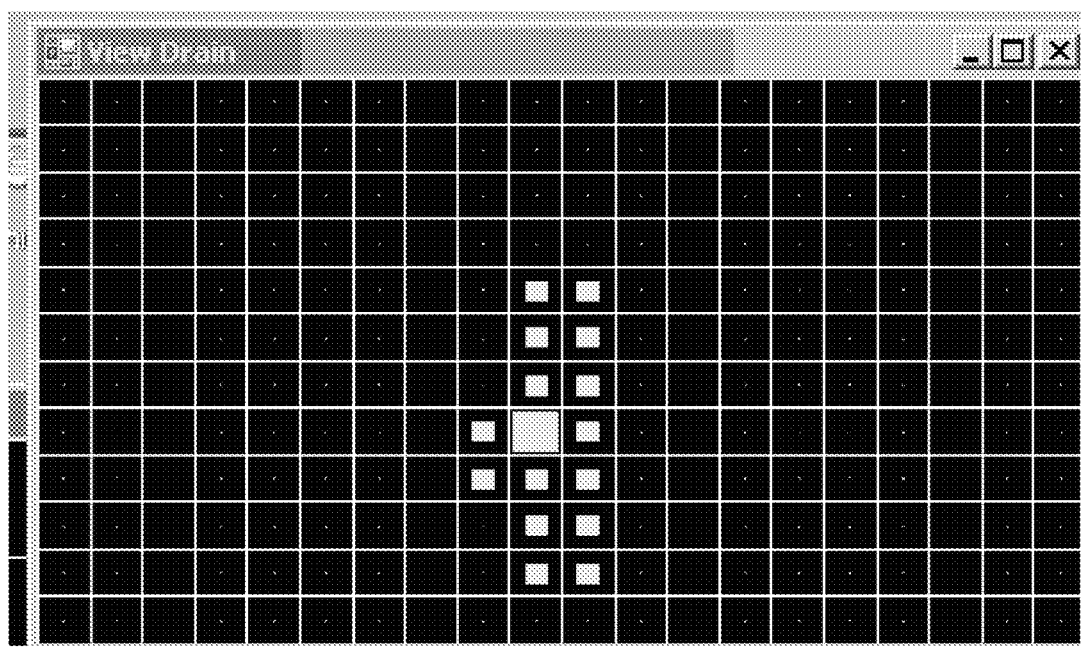
FIG. 7 is a representation of locations showing results, and a location identified as the maximum of the object.

FIG. 7 is an illustration of a single finger being identified within the results shown in FIG. 3 after applying the steps of the first embodiment of the present invention.

The hill climbing algorithm portion of the first embodiment may be used without the hill descending algorithm if only a single finger location is to be identified, only a single finger is present, or if a different method for grouping the results with a specific finger is used. Once a starting location, such as the current first finger location has been identified, the hill descending algorithm may begin.

While the first embodiment shows the hill climbing algorithm being used with the hill descending algorithm, the hill descending algorithm may be used regardless of the method of identifying the start location.

Repetitions of the hill climbing algorithm and the hill descending algorithm varies with the number of fingers present and the number of fingers required to be found, as well as whether or not shape and/or size information about the finger(s) may be desired.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for detecting and tracking multiple objects using a two dimensional set of measurements from a touch sensor, said method comprising:
   1) scanning a two-dimensional array of locations to identify a first finger location having a result which is greater than zero such that the first finger location indicates the presence of at least one finger;
   2) performing a hill climbing algorithm in a measurement cycle to determine if there is a location immediately adjacent to the first finger location that has a higher value which does not cause the hill climbing procedure to enter into an infinite loop around an actual location of a finger that causes the hill climbing algorithm to not identify the first finger location with a maximum result, and terminating the infinite loop when the hill climbing procedure repeats a location in the current measurement cycle;
   3) repeating the hill climbing algorithm until the highest first finger location is found; and
   4) performing a hill descending algorithm to identify a boundary between the first finger location and a second finger.

2. The method as defined in claim 1 wherein the method further comprises oversampling the two dimensional array of locations when scanning to thereby make certain that at least one adjacent location to the first finger location also has a result to thereby confirm the presence of at least one finger.

3. The method as defined in claim 1 wherein the hill climbing algorithm further comprises bypassing local minima caused by aliasing in order to find the first finger location with the highest value to create a new current first finger location by comparing a weighted sum of near cross axis results.

4. The method as defined in claim 3 wherein the hill climbing algorithm further comprises performing a 4-connected comparison of the four closest locations in order to determine the new current first finger location.

5. The method as defined in claim 4 wherein comparing a weighted sum of near cross axis results further comprises creating separate filtered data arrays for each climbing direction around the current first finger location.

6. The method as defined in claim 5 wherein the weighted sum further comprises applying a weighted pattern that gives more weight to some locations and less weight to other locations.

7. The method as defined in claim 1 wherein the hill descending algorithm further comprises including a range of results which are then considered to be part of the same finger.

8. The method as defined in claim 7 wherein the hill descending algorithm further comprises identifying a boundary with an adjacent finger by comparison of adjacent results, with range.

9. The method as defined in claim 8 wherein the method further comprises repeating steps 1 through 4 while excluding any fingers that are already identified.

10. A method for detecting and tracking a single object using a two-dimensional set of measurements from a touch sensor, said method comprising:
   1) scanning a two-dimensional array of locations to identify a finger location having a result which is greater than zero such that the first finger location indicates the presence of the finger;
   2) performing a hill climbing algorithm in a measurement cycle to determine if there is a location immediately adjacent to the finger location that has a higher value which does not cause the hill climbing procedure to enter into an infinite loop around an actual location of a finger that causes the hill climbing algorithm to not identify the first finger location with a maximum result, and terminating the infinite loop when the hill climbing procedure repeats a location in the current measurement cycle; and
   3) repeating the hill climbing procedure until the highest finger location is found.

11. The method as defined in claim 10 wherein the method further comprises oversampling the two dimensional array of locations when scanning to thereby make certain that at least one adjacent location to the finger location also has a result to thereby confirm the presence of the finger.

12. The method as defined in claim 10 wherein the hill climbing algorithm further comprises bypassing local minima caused by aliasing in order to find the finger location with the highest value to create a new finger location by comparing a weighted sum of near cross axis results.

13. The method as defined in claim 12 wherein the hill climbing algorithm further comprises performing a 4-connected comparison of the four closest locations in order to determine the new current finger location.

14. The method as defined in claim 13 wherein comparing a weighted sum of near cross axis results further comprises creating separate filtered data arrays for each climbing direction around the current finger location.

15. The method as defined in claim 14 wherein the weighted sum further comprises applying a weighted pattern that gives more weight to some locations and less weight to other locations.

16. The method as defined in claim 10 wherein the hill descending algorithm further comprises including a range of results which are then considered to be part of the finger.

17. The method as defined in claim 1 wherein the hill climbing algorithm further comprises terminating the infinite loop when the hill climbing algorithm has moved N number of times, where N is selected to be the number of steps that are sufficient to determine that the hill climbing algorithm has found the maximum result.

18. The method as defined in claim 10 wherein the hill climbing algorithm further comprises terminating the infinite loop when the hill climbing algorithm has moved N number of times, where N is selected to be the number of steps that are sufficient to determine that the hill climbing algorithm has found the maximum result.

* * * * *